Nov. 10, 1931.  E. LATSHAW  1,831,714
CAR TRUCK
Filed Feb. 6, 1930  2 Sheets-Sheet 1

Inventor:
Elmer Latshaw
by his Attorneys
Howson & Howson

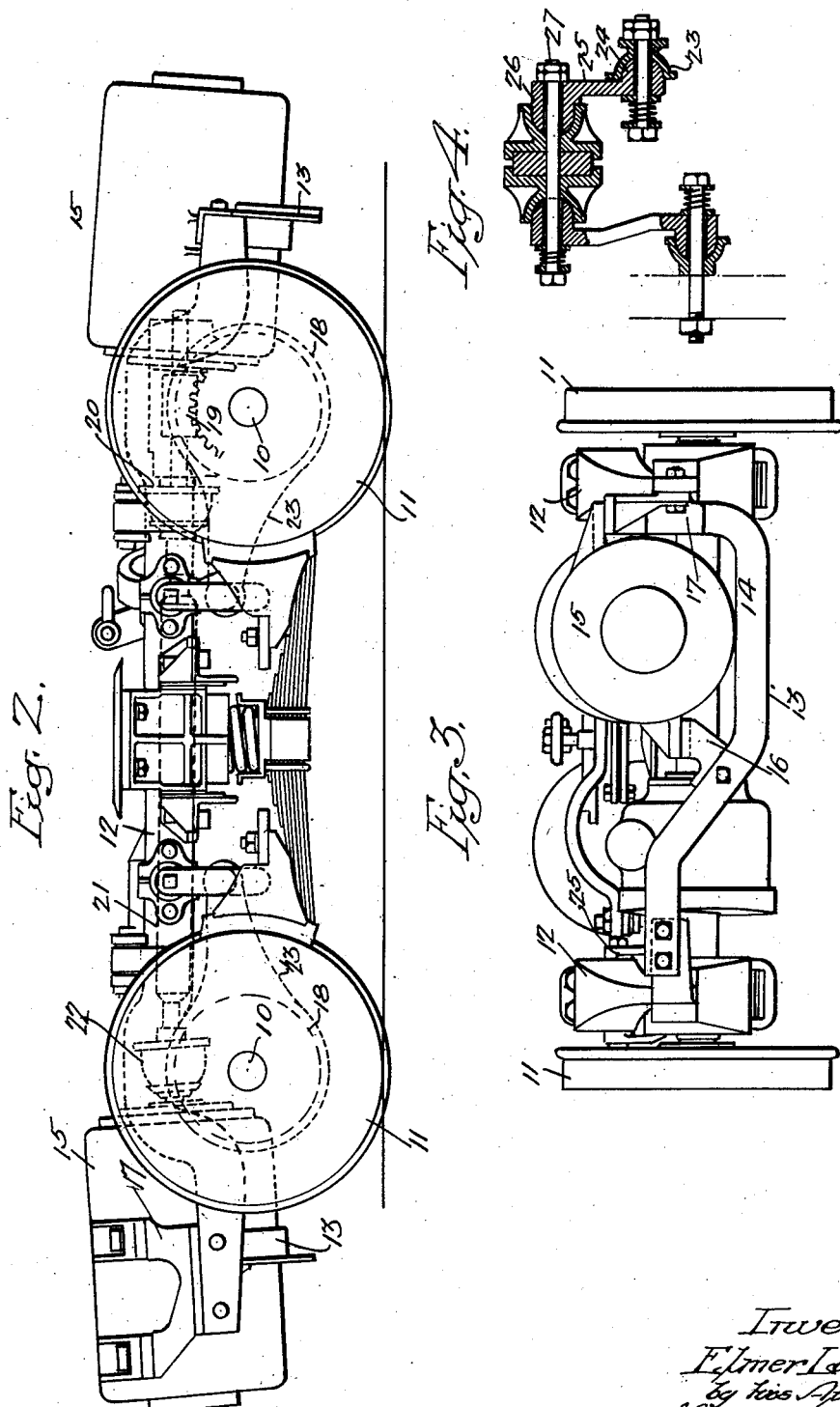

Patented Nov. 10, 1931

1,831,714

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

CAR TRUCK

Application filed February 6, 1930. Serial No. 426,196.

This invention relates to car trucks, and more particularly to the production of a car truck wherein the driving motors are arranged outwardly of the wheel base.

An important object of the invention is to provide in a car truck a construction providing a very low truck while at the same time providing an efficient direct drive to the several axles of the truck from motors supported from the truck frame.

Another object of the invention is the production of a car truck having a very short wheel base, while at the same time providing a very low structure in which all of the advantages of short turning and low structure are combined in a manner permitting an efficient drive.

A further object of the invention is the provision of a construction of this character insuring maintenance of the transmission housing in proper alignment with the truck frame.

A still further and more specific object of the invention is the provision in a truck of a drive wherein the motor is arranged beyond the wheel base and drives the axle of the truck which is remotely disposed with relation thereto.

These and other objects I attain by the construction shown in the accompanying drawings wherein, for the purpose of illustration, I have shown a preferred embodiment of my invention and wherein:

Fig. 2 is a side elevation thereof;

Fig. 3 is an end elevation thereof; and

Fig. 4 is an enlarged section showing the link connection between the frame and the torque arm.

Figure 1:
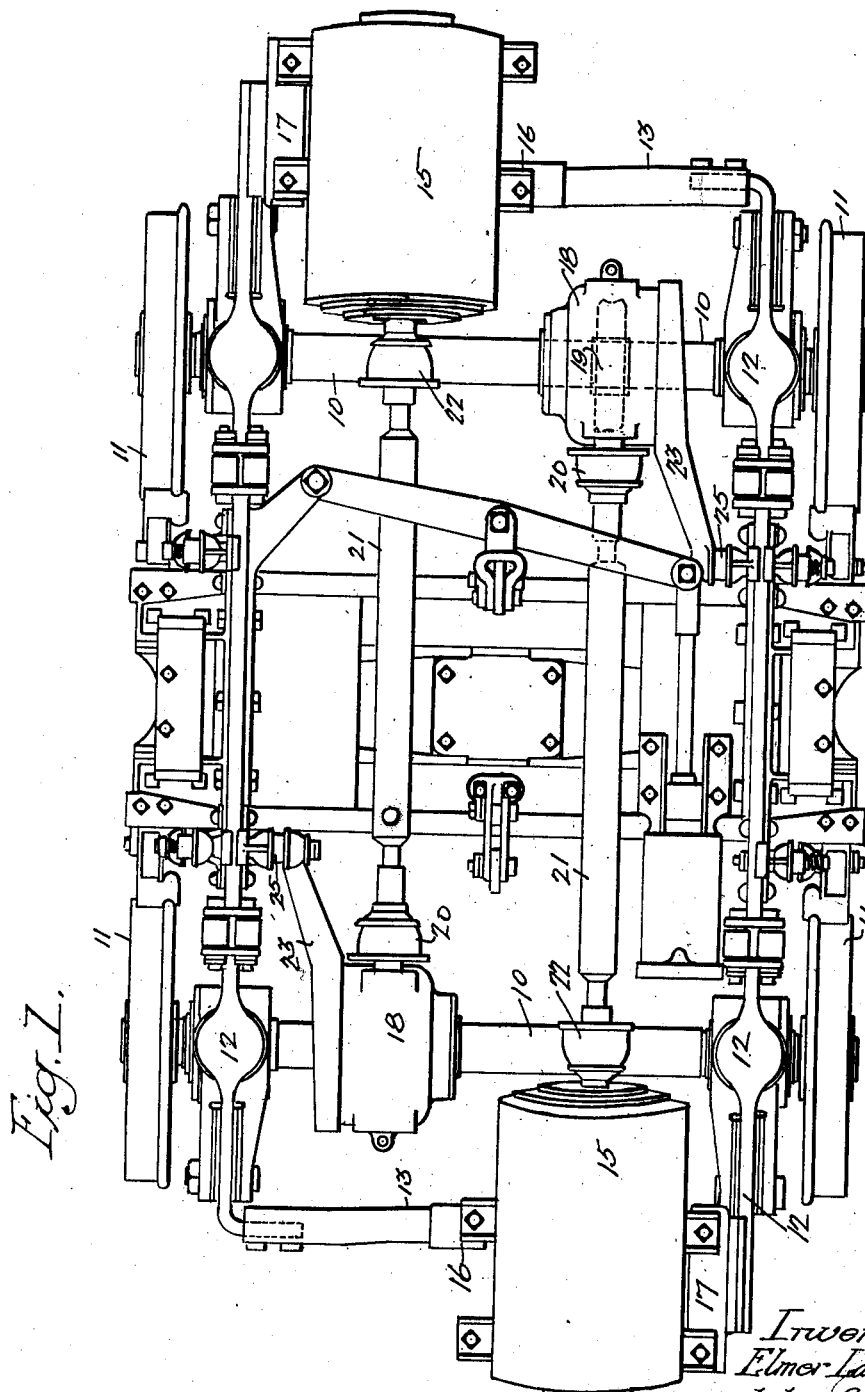
Fig. 1 is a plan view of a car truck constructed in accordance with my invention.

Referring now more particularly to the drawings, the numeral 10 indicates drive axles having the usual supporting wheels 11. These axles support opposite ends of a frame 12 which, in accordance with the present invention, is extended well beyond the axles and provided at its opposite ends with cross bars 13 connecting opposite ends of the side members thereof. Each cross bar 13 adjacent one end thereof is formed with an arcuate seat 14 to receive a motor 15, the motor being bolted to the cross frame at one side as at 16 and at its opposite side being bolted to a casting 17 supported from the adjacent end of the side member 12.

In alignment with each motor 15 the axle 10, remote from this motor, has mounted thereon a gear casing 18 housing reduction gearing 19. This gearing includes an input shaft connected through a universal joint 20 with a longitudinally-extending drive shaft 21. The opposite end of this shaft is connected through a universal joint 22 with the aligned motor. It will be noted that by disposition of the motor outwardly of the wheel base the advantages of a long driving shaft are obtained and the motor is so positioned that the overhead clearance is reduced, the upper surface of the motor actually lying but a few inches above the level of the upper surface of the wheels of the truck. This permits production of a very low truck such as is necessary in ordinary street car construction.

In order that the gear case may be held in proper relation to the frame and may be supported therefrom in a manner accommodating the axle in its necessary movements, I bolt to one side of the housing a torque arm 23, which torque arm extends longitudinally of the frame and is connected through a half ball and socket joint 24 to the lower end of an arm 25, the upper end of which is connected through a second half ball and socket joint 26 to the adjacent side member of the frame. Each half ball and socket joint has the elements thereof held in assembled relation by the through bolt 27 having clearance in one of the elements of the joint permitting the necessary movement so that a substantially universal connection between the frame and the gear casing is maintained.

Attention is directed to the fact that in addition to the advantages hereinbefore set forth, disposition of the driving motors outwardly of the wheel base permits the axles to be drawn together very closely, thus providing the necessary short wheel base for short turns and providing this structure without the necessity of producing a high truck. This enables the truck to be employed in street cars where there is an extremely restricted clearance and short turning apparatus is practically essential.

As the construction employed is capable of a certain range of change and modification without in any manner departing from the spirit of my invention, I do not wish to be understood as limiting myself thereto except as hereinafter claimed.

I claim:

1. In a car truck, an axle, a frame supported thereby, driving means for the axle including reduction gearing carried by the axle, a housing for said reduction gearing, a longitudinally-extending torque arm secured to said housing, a universal connection between said torque arm and the frame including a link pivoted to the frame, a half ball and socket connection between said link and said torque arm and means connecting the elements of said half ball and socket connection permitting limited separation thereof in a direction transverse to the truck while yieldably resisting such separation.

2. In a car truck, an axle, a frame supported thereby, driving means for the axle including reduction gearing carried by the axle, a housing for said reduction gearing, a longitudinally-extending torque arm secured to said housing, a universal connection between said torque arm and the frame, including a link, a half ball and socket connection between one end of the link and the frame, a half ball and socket connection between the opposite end of the link and the torque arm and means connecting the elements of said half ball and socket connections yieldably resisting separation thereof while permitting such separation to a limited extent.

3. In a car truck, spaced supporting axles, a frame supported thereby, motors supported by the frame outwardly of the axles, reduction gearing carried by each axle, a driving connection between each motor and the reduction gearing of the axle remote therefrom, housings for the reduction gears, a torque arm secured to each housing and extending longitudinally of the frame, a link for each torque arm having a semi-universal joint connection with the frame and a semi-universal connection between said link and the associated torque arm, said semi-universal joint connections each permitting separation of the elements connected thereby in a direction transverse to the truck while yieldably resisting such separation.

4. In a pivotal car truck, independent driving axles, a frame supported thereby, motors carried by the frame and disposed entirely outwardly of the axles, and a horizontal driving connection between each motor and the axle remote therefrom.

5. In a pivotal car truck, independent driving axles, a frame supported thereby, motors supported by the frame and disposed entirely outwardly of the axles, reduction gearing carried by each axle, and a horizontal driving connection between each motor and the reduction gearing of the axle remote therefrom.

6. In a pivotal car truck, independent driving axles, a frame supported thereby and including transverse members at opposite ends thereof arranged outwardly of the adjacent axle, a motor supported by each transverse member and having its inner end arranged outwardly of the adjacent axle, and a horizontal driving connection between each motor and the axle remote therefrom.

7. In a pivotal car truck, independent driving axles, a frame supported thereby, a motor supported by one end of the frame and disposed entirely outwardly of the adjacent axle, and a horizontal driving connection between said motor and the other of the axles.

ELMER LATSHAW.